United States Patent
Sato et al.

(10) Patent No.: US 6,815,492 B2
(45) Date of Patent: Nov. 9, 2004

(54) RUBBER PARTS FOR AIRCRAFT

(75) Inventors: Shinichi Sato, Gunma-ken (JP);
Masatoshi Arai, Gunma-ken (JP);
Yasuhisa Osawa, Gunma-ken (JP);
Makoto Sato, Gunma-ken (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 62 days.

(21) Appl. No.: 10/230,337

(22) Filed: Aug. 29, 2002

(65) Prior Publication Data

US 2003/0083426 A1 May 1, 2003

(30) Foreign Application Priority Data

Aug. 29, 2001 (JP) ........................................ 2001-259925

(51) Int. Cl.$^7$ ................................................. C08J 3/00
(52) U.S. Cl. ........................ 524/588; 524/265; 528/15; 525/474
(58) Field of Search ................................ 524/588, 265, 524/544, 730; 528/15; 525/474

(56) References Cited

U.S. PATENT DOCUMENTS

| 3,445,420 A | | 5/1969 | Kookootsedes et al. ...... 260/37 |
| 3,532,649 A | | 10/1970 | Smith et al. .................. 260/18 |
| 5,591,797 A | * | 1/1997 | Barthel et al. ............... 524/493 |
| 5,665,846 A | * | 9/1997 | Sato et al. .................... 528/15 |
| 5,837,774 A | * | 11/1998 | Tarumi et al. ............... 525/104 |
| 5,919,886 A | * | 7/1999 | Matsuda et al. .............. 528/42 |
| 5,936,111 A | * | 8/1999 | Tarumi et al. ............... 556/419 |

FOREIGN PATENT DOCUMENTS

| EP | 0 967 251 A1 | 12/1999 |
| EP | 1 033 387 A2 | 9/2000 |
| EP | 1 048 432 A1 | 11/2000 |
| EP | 1 114 846 A2 | 7/2001 |
| JP | 48-010947 B | 4/1973 |
| JP | 2-160853 A2 | 6/1990 |
| JP | 4-003774 B2 | 1/1992 |
| JP | 2000-007835 A | 1/2000 |
| JP | 2001-011193 A | 1/2001 |
| JP | 2001-106893 A | 4/2001 |
| JP | 2001-164115 A | 6/2001 |
| JP | 2002-020615 A | 1/2002 |

* cited by examiner

*Primary Examiner*—David W. Wu
*Assistant Examiner*—Henry Hu
(74) *Attorney, Agent, or Firm*—Birch, Stewart, Kolasch & Birch, LLP

(57) ABSTRACT

Rubber aircraft parts are made of the cured form of a curable composition comprising a perfluoropolyether polymer having a perfluoropolyether backbone and at least one reactive group, a crosslinking agent for crosslinking the polymer, and a silica filler having an average particle size of 0.001–10 µm. By providing dramatically improved sealability at low temperatures of −25 to −55° C., particularly during use in a dynamic state, and much improved resistance to amines and other chemicals, such rubber parts can ensure the reliable sealability of fluid line junctions in jet engines.

5 Claims, No Drawings

RUBBER PARTS FOR AIRCRAFT

BACKGROUND OF THE INVENTION

1. Field of the Invention

The present invention relates to rubber parts for aircraft. More particularly, it relates to rubber parts used as sealing components (e.g., aircraft O-rings, packings, gaskets, face seals) which come into contact with substances such as engine oil and jet fuel.

2. Prior Art

Rubber parts for aircraft, especially those used as fluid sealing components around jet engines, include O-rings (e.g., fluid line O-rings), seals (e.g., face seals, packings, gaskets), diaphragms and valves for aircraft engine oils, jet fuels, hydraulic oils and aviation hydraulic fluids such as Skydrol.

During use, such rubber parts often inevitably come into contact with fluids used in aircraft, such as engine oils (e.g., Mobil 254), jet fuels, hydraulic oils, and aviation hydraulic fluids such as Skydrol. To ensure normal operation, these aircraft parts are required to be resistant to jet fuels, resistant to carboxylic acids that arise from the oxidative degradation of synthetic oils (e.g., engine oils), resistant to amines and oils, and also resistant to gas permeability, heat and water. In addition, because aircraft are commonly operated in cold regions and at altitudes where low temperatures prevail, such rubber parts must also have a good cold resistance.

Hence, these aircraft parts are generally made of such materials as vinylidene fluoride-hexafluoropropylene copolymer-based fluororubbers, vinylidene fluoride-ethylene tetrafluoride-perfluorovinyl methyl ether copolymer-based cold-resistant fluororubbers, or fluorosilicones.

Vinylidene fluoride-propylene hexafluoride copolymers, though endowed with excellent heat resistance, resistance to oil and gasoline, and flexing resistance, lack sufficient cold resistance. The lower limit in their service temperature is −20° C. for static sealing applications, and −10° C. for dynamic sealing applications (e.g., diaphragms). In addition, such copolymers undergo considerable swelling in alcohols and ketones, becoming unfit for use thereafter. They are also subject to severe deterioration by amine-based additives in lubricating oils. Vinylidene-fluoride-ethylene tetrafluoride-perfluorovinyl methyl ether copolymers can be used at temperatures down to −30° C. in static sealing applications, and down to −25° C. in dynamic sealing applications, but even this falls short of cold resistance requirements today. Apart from their cold resistance, these copolymers have the same drawbacks as vinylidene fluoride-hexafluoropropylene copolymers.

Fluorosilicones have an excellent cold resistance, but an inadequate resistance to amines. In addition, they have a poor resistance to gas permeability and a poor water resistance.

A need has thus been felt for rubber parts endowed with each of the above properties to the desired degree.

SUMMARY OF THE INVENTION

It is therefore an object of the invention to provide rubber aircraft parts which are endowed with good resistance to jet fuels, jet engine oils, amines and oils, good resistance to gas permeability, good resistance to heat and water, and also outstanding cold resistance.

We have found that rubber aircraft parts endowed with good resistance to jet fuels, jet engine oils, amines and oils, good resistance to gas permeability, good heat and water resistance, and excellent cold resistance, can be obtained by using the cured form of a curable composition which includes a perfluoropolyether polymer of perfluoropolyether backbone having at least one reactive group, a crosslinking agent for crosslinking the polymer, and a silica filler having an average particle size of 0.001 to 10 μm. In addition, we have discovered that such parts can be imparted with a dramatically improved low-temperature sealability at temperatures below the minimum service temperatures normally achievable in prior-art low-temperature fluororubbers, i.e., at −25 to −55° C., particularly in a dynamic state, and can also be imparted with a markedly improved resistance to amines and other chemicals, thus making it possible to reliably ensure the sealability of fluid line junctions in jet engines.

Accordingly, the invention provides rubber aircraft parts which are made of the cured form of a curable composition that includes a perfluoropolyether polymer having a perfluoropolyether backbone and at least one reactive group, a crosslinking agent for crosslinking the polymer, and a silica filler having an average particle size of 0.001 to 10 μm. The invention also provides a method of using the above cured product as a fluid sealing component around a jet engine.

DETAILED DESCRIPTION OF THE INVENTION

As mentioned above, the rubber aircraft parts of the invention are made of the cured form of a curable composition which includes a perfluoropolyether polymer, a crosslinking agent and a silica filler.

Any curable composition of the above type may be used, although a curable fluoropolyether rubber composition containing:
(A) a linear fluoropolyether compound having at least two alkenyl groups per molecule and a backbone with a perfluoropolyether structure;
(B) an organosilicon compound having at least two silicon-bonded hydrogen atoms (SiH groups) per molecule;
(C) a hydrosilylation catalyst; and
(D) a silica filler is especially preferred.

Component A is a linear fluoropolyether compound having at least two alkenyl groups per molecule and a backbone with a divalent perfluoroalkyl ether structure.

The perfluoroalkyl ether structure contains a plurality of —$C_dF_{2d}$O— repeating units, the letter d in each unit being independently an integer from 1 to 6. Exemplary perfluoroalkyl ether structures include those of general formula (1) below $$(C_dF_{2d}O)_q \quad (1)$$

wherein q is an integer from 1 to 500, preferably from 2 to 400, and most preferably from 10 to 200.

Examples of the repeating unit —$C_dF_{2d}$O— represented by above formula (1) include —$CF_2$O—, —$CF_2CF_2$O—, 

—$CF_2CF_2CF_2CF_2O$—, —$CF_2CF_2CF_2CF_2CF_2CF_2O$— and —$C(CF_3)_2O$—. Of these, —$CF_2O$—, —$CF_2CF_2O$—, —$CF_2CF_2CF_2O$— and —$CF(CF_3)CF_2O$— are preferred. More preferably, the perfluoropolyether polymer has a perfluoropolyether backbone with a structure of the following general formula:

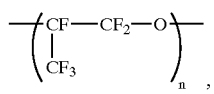

wherein n is an integer which is at least 10, and especially 30 to 200.

The perfluoroalkyl ether structure may be composed of only one of these types of repeating unit, or may be a combination of two or more such types.

It is advantageous for the alkenyl groups on the linear fluoropolyether compound serving as component A to have 2 to 8 carbons, and preferably 2 to 6 carbons, and to have a $CH_2=CH$— structure at the end. Illustrative examples include vinyl, allyl, propenyl, isopropenyl, butenyl and hexenyl. Of these, vinyl and allyl are preferred. The alkenyl groups may be present at intermediate positions on the molecule chain, although it is preferable for them to be bonded to both ends of the molecular chain. In the latter case, they may be bonded directly to both ends of the linear fluoropolyether compound backbone or bonded to the backbone through divalent linkages such as the following:

—$CH_2$—, —$CH_2O$—, —Y—NR'—CO—.

Here, Y is —$CH_2$— or a group of the structural formula (2)

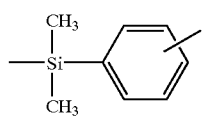

(2)

(wherein the free valence bond may be at the o-, m- or p-position); and R' is a hydrogen atom or a methyl, phenyl or allyl group.

The linear fluoropolyether compound of component A is preferably a linear compound of general formula (3) or (4) below:

$$CH_2=CH-(X)_p-Rf-(X)_p-CH=CH_2 \quad (3)$$

$$CH_2=CH-(X)_p-Q-Rf-Q-(X)_p-CH=CH_2 \quad (4).$$

In formulas (3) and (4), X is independently —$CH_2$—, —$CH_2O$— or —Y—NR'—CO— wherein Y and R' are as defined above. Rf is a divalent perfluoropolyether structure, and preferably one of above formula (1); that is, of the formula $(C_dF_{2d}O)_q$. The letter p is independently 0 or 1. Q is a divalent hydrocarbon group of 1 to 15 carbons which may include an ether linkage, such as alkylene groups and ether linkage-containing alkylene groups.

The linear fluoropolyether compound serving as component A of the curable composition is most preferably a compound of the following general formula.

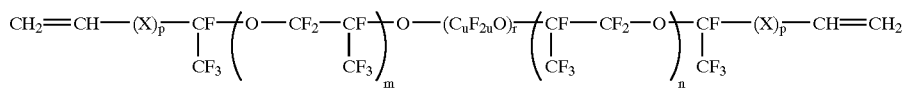

In the formula, X is as defined above; p is independently 0 or 1; r is an integer from 1 to 6; u is an integer from 2 to 6; and m and n are independently integers from 0 to 200.

The linear fluoropolyether compound has a weight-average molecular weight of preferably 4,000 to 100,000, and most preferably 1,000 to 50,000.

Specific examples of the linear fluoropolyether compound include the following compounds. The letters m and n in these compounds are as defined above.

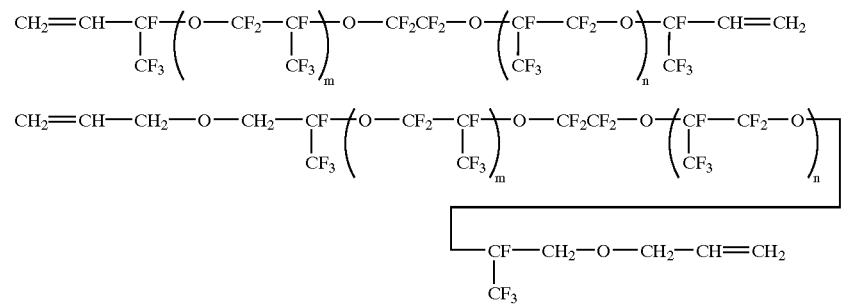

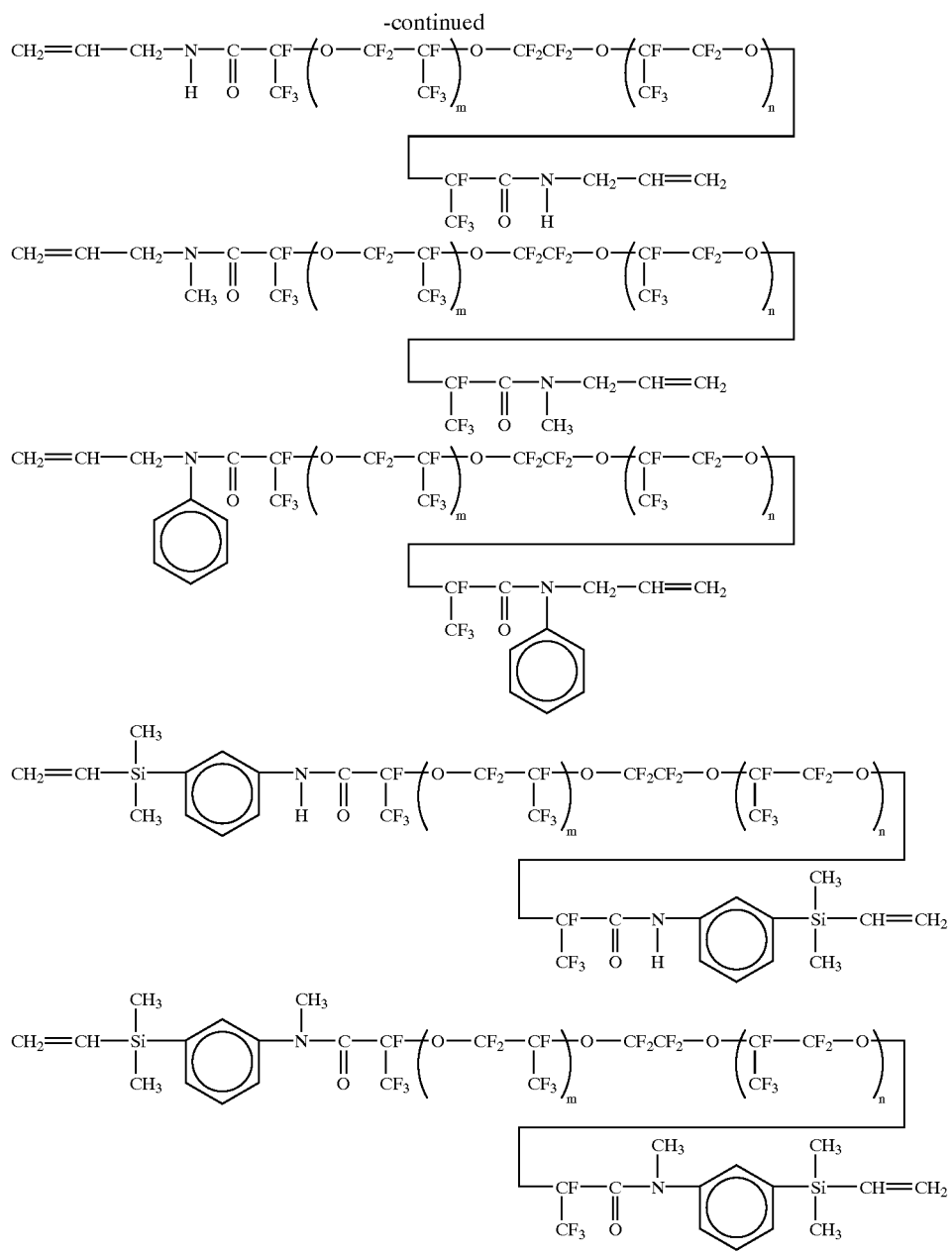

In the practice of the invention, to modify the linear fluoropolyether compound to the desired weight-average molecular weight in accordance with the intended use, the above-described linear fluoropolyether compound may first be subjected to hydrosilylation with an organosilicon compound bearing two SiH groups by means of an ordinary method and under ordinary conditions. The resulting chain-extended product can then be used as component A.

Component B of the curable composition used to make the rubber parts of the invention acts as a crosslinking agent and chain extender for component A. Component B is not subject to any particular limitation, provided it is an organosilicon compound having at least two silicon-bonded hydrogen atoms on the molecule. However, it is preferably (a) a fluorinated organohydrosiloxane and/or (b) an organosilicon compound in which every silicon-bonded hydrogen atom belongs to a

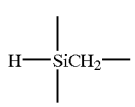

structure.

The fluorinated organohydrosiloxane (a) has at least one monovalent perfluorooxyalkyl, monovalent perfluoroalkyl, divalent perfluorooxyalkylene or divalent perfluoroalkylene group per molecule. It has also at least two, and preferably at least three, hydrosilyl groups (SiH), per molecule. Preferred examples of such perfluorooxyalkyl, perfluoroalkyl, perfluorooxyalkylene and perfluoroalkylene groups include those of the following general formulas: monovalent perfluoroalkyl groups of the formula $C_mF_{2m+1}-$ (wherein the letter m is an integer from 1 to 20, and preferably from 2 to 10),
divalent perfluoroalkylene groups of the formula

(wherein the letter m is an integer from 1 to 20, and preferably from 2 to 10),
monovalent perfluorooxyalkyl groups of the formula

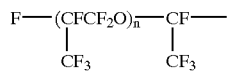

(wherein the letter n is an integer from 1 to 5), and divalent perfluorooxyalkylene groups of the formula

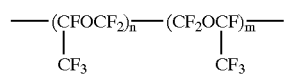

(wherein $\overline{m+n}$ is an integer from 2 to 100).

The fluorinated organohydrosiloxane may be cyclic or acyclic, and may also have a three-dimensional network structure. Especially preferred fluorinated organohydrosiloxanes are those having on the molecule, as a silicon-bonded monovalent substituent, at least one monovalent organic group containing a perfluoroalkyl, perfluoroalkyl ether or perfluoroalkylene group of any of the following general formulas:

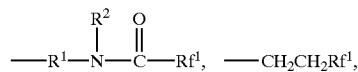

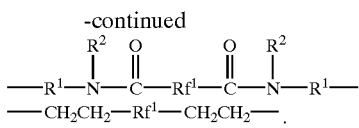

In the above formulas, $R^1$ is a preferably $C_{1-10}$, and most preferably $C_{2-6}$, divalent hydrocarbon group such as an alkylene group (e.g., a methylene, ethylene, propylene, methylethylene, tetramethylene or hexamethylene group) or an arylene group (e.g., a phenylene group); $R^2$ is a hydrogen atom or a preferably $C_{1-8}$, and most preferably $C_{1-6}$, monovalent hydrocarbon group having no aliphatic unsaturated bonds; and $Rf^1$ is a monovalent perfluoroalkyl, monovalent perfluorooxyalkyl, divalent perfluorooxyalkylene or divalent perfluoroalkylene group of the general formulas shown above.

Aside from monovalent organic groups containing a monovalent or divalent fluorinated substituent (e.g., a perfluoroalkyl, perfluorooxyalkyl, perfluorooxyalkylene or perfluoroalkylene group), the silicon-bonded monovalent substituent in fluorinated organohydrosiloxanes (a) may be a monovalent hydrocarbon group of the same type as those represented above as $R^2$, preferably one free of aliphatic unsaturated bonds and containing 1 to 8 carbons, and especially 1 to 6 carbons.

No particular limitation is imposed on the number of silicon atoms per molecule in the fluorinated organohydrosiloxane, although it is generally about 2 to 60, and preferably about 4 to 30.

Examples of the fluorinated organohydrogensiloxane (a) include the following compounds. In the following formulae, Me is methyl and Ph is phenyl.

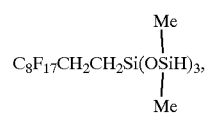

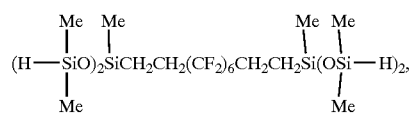

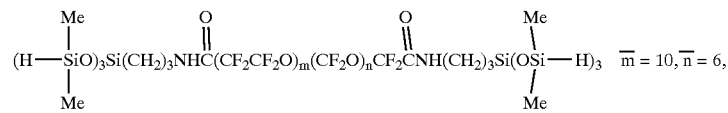

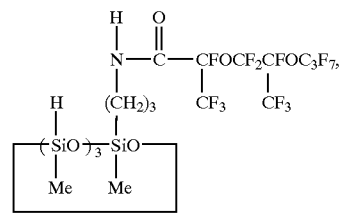

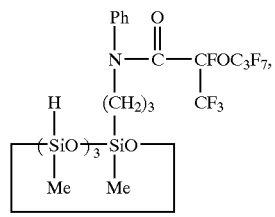

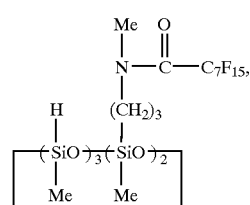

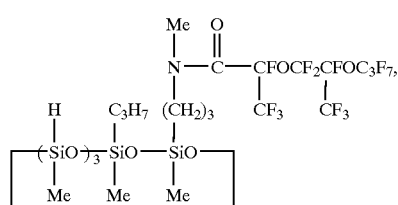

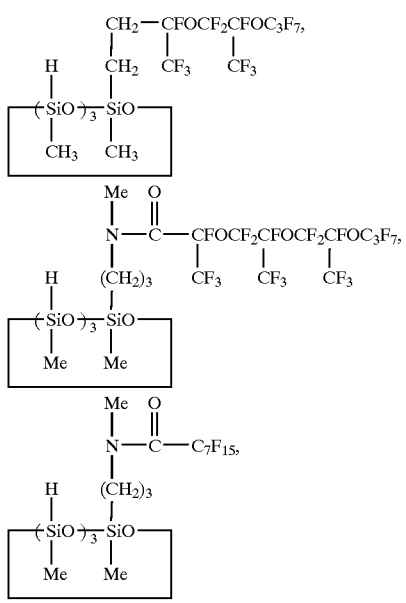
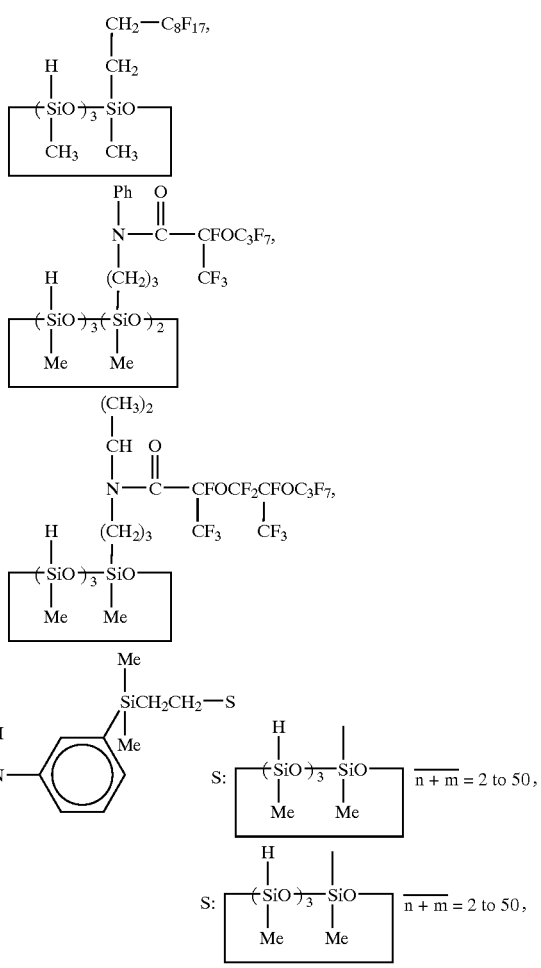
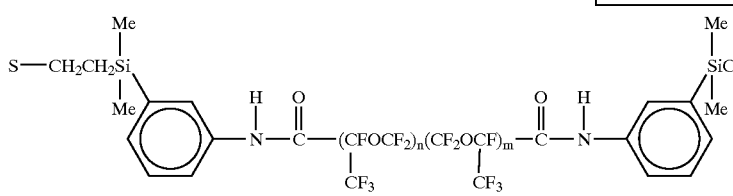
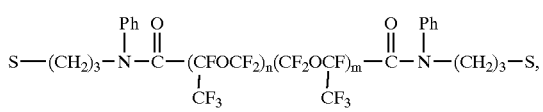
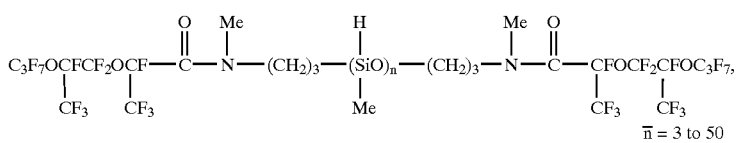
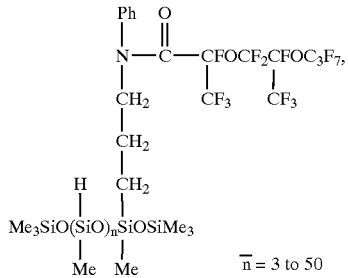
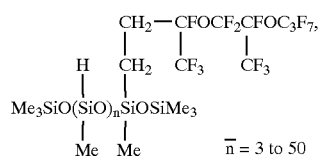
The organosilicon compound (b) in which every silicon-bonded hydrogen atom belongs to a
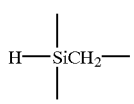
structure preferably has general formula (5) below
$$\left[ M_s\!-\!\underset{R_{3-s}}{\overset{\phantom{R}}{\underset{|}{Si}}}\!\right]_a\!-\!Z\!-\!\left[\underset{R_{3-t}}{\overset{\phantom{R}}{\underset{|}{Si}}}\!-\!M_t\right]_b. \tag{5}$$
In formula (5), N is a moiety of the following general formula M: 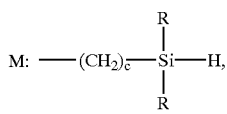

wherein the letter c is 1, 2, 3 or 4; each R is independently a monovalent $C_{1-20}$, and preferably $C_{1-6}$, hydrocarbon; Z is —Q'—M, —Q'—Rf', —Q'—, —Rf''— or —Q'—Rf''—Q'— (Q' being a divalent $C_{1-15}$ linkage, Rf' being a monovalent perfluoroalkyl or perfluorooxyalkyl group, and Rf'' being a divalent perfluoroalkylene or perfluorooxyalkylene group); the letter s is 1, 2 or 3; the letter t is 1, 2 or 3; and the letters a and b are 0 or 1, provided a and b are not both 0.

R is described later in the specification. Illustrative examples of Q' include alkylene groups such as methylene, ethylene, propylene and hexylene groups, as well as these alkylene groups with an ether linkage (—O—) on the chain thereof. The monovalent perfluoroalkyl and perfluorooxyalkyl groups serving as Rf', and the divalent perfluoroalkylene and perfluorooxyalkylene groups serving as Rf'' are described subsequently.

Illustrative examples of the above-described organosilicon compound include compounds of the following formulas, wherein "Me" stands for methyl.

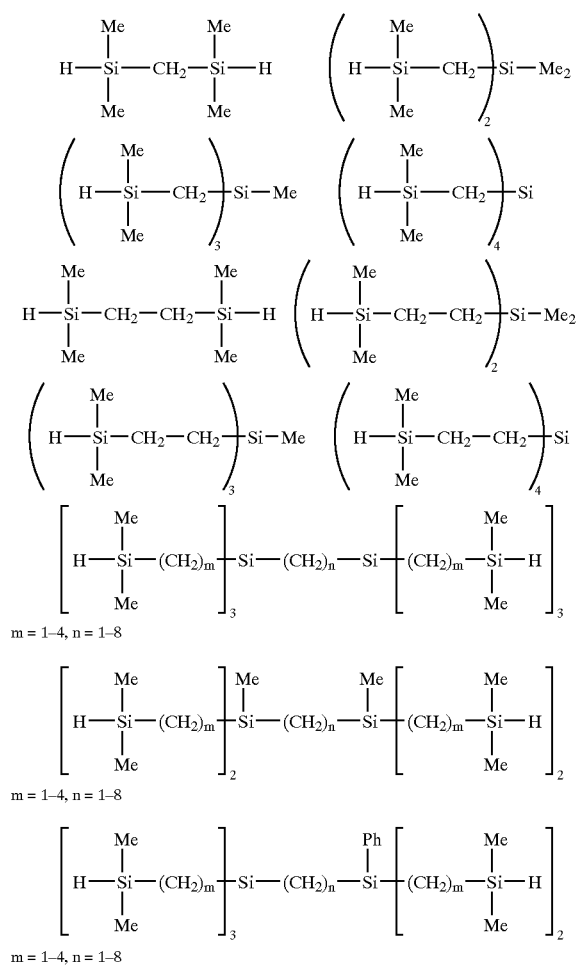

m = 1–4, n = 1–8 m = 1–4, n = 1–8 m = 1–4, n = 1–8

An organosilicon compound having at least one monovalent perfluoroalkyl or monovalent perfluorooxyalkyl group shown as Rf', or divalent perfluoroalkylene or divalent perfluorooxyalkylene group shown as Rf'' per molecule can be used to provide good compatibility with component A, good dispersibility, and good uniformity of the composition when cured.

Preferred examples of such perfluoroalkyl, perfluorooxyalkyl, perfluoroalkylene and perfluorooxyalkylene groups include those of the following general formulas:

monovalent perfluoroalkyl groups of the formula

(wherein the letter g is an integer from 1 to 20, and preferably 2 to 10), divalent perfluoroalkylene groups of the formula

(wherein the letter g is an integer from 1 to 20, and preferably from 2 to 10), monovalent perfluorooxyalkyl groups of the formula

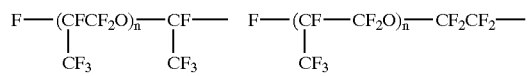

(wherein the letter n is an integer from 1 to 5), divalent perfluorooxyalkylene groups of the formula

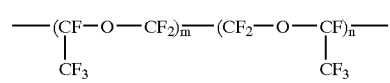

(wherein m+n is an integer from 1 to 200), and

(wherein the letters m and n are each integers from 1 to 50).

These perfluoro(oxy)alkyl and perfluoro(oxy)alkylene groups may be directly bonded to a silicon atom, or may be bonded to a silicon atom through a divalent linkage shown as Q'. Exemplary divalent linkages include alkylene groups, arylene groups, and combinations thereof, as well as any of these together with an intervening ether-bonding oxygen atom, amide bond, carbonyl bond or the like. The divalent linkage has preferably 2 to 12 carbons. Illustrative examples include —$CH_2CH_2$—, —$CH_2CH_2CH_2$—, —$CH_2CH_2CH_2OCH_2$—, —$CH_2CH_2CH_2$—NH—CO—, —$CH_2CH_2CH_2$—N(Ph)—CO— (Ph being a phenyl group), —$CH_2CH_2CH_2$—N($CH_3$)—CO— and —$CH_2CH_2CH_2$—O—CO—.

Illustrative examples of the silicon-bonded monovalent hydrocarbon group R on the organosilicon compound serving as above component (b) include $C_{1-20}$ hydrocarbon groups such as alkyl groups (e.g., methyl, ethyl, propyl, butyl, hexyl, cyclohexyl, octyl, decyl), aryl groups (e.g., phenyl, tolyl, naphthyl), and aralkyl groups (e.g., benzyl, phenylethyl).

The number of silicon atoms per molecule on the organosilicon compound, although not subject to any particular limitation, is generally about 2 to 60, and preferably about 3 to 30.

Illustrative examples of such organosilicon compounds include the compounds shown below. The following compounds may be used alone or as combinations of two or more thereof. In the formulas shown below, "Me" stands for methyl and "Ph" stands for phenyl.

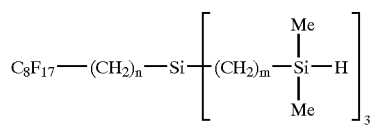

m = 1–4, n = 1–8

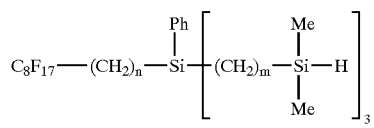

m = 1–4, n = 1–8

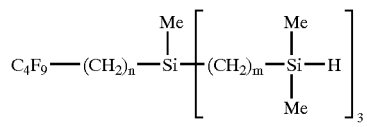

m = 1–4, n = 1–8

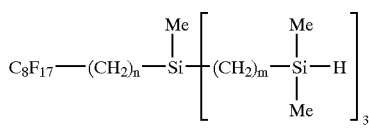

m = 1–4, n = 1–8

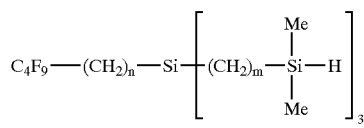

m = 1–4, n = 1–8

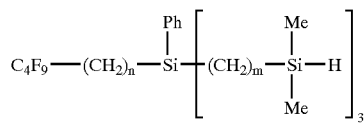

m = 1–4, n = 1–8

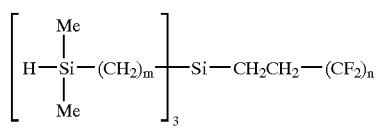

m = 1–4, n = 1–8

m = 1–4, n = 1–8

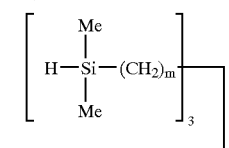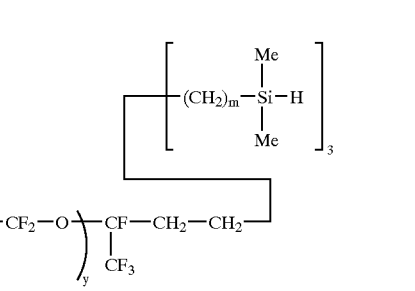

x = 1–200, y = 1–200, r = 2–10, m = 1–4

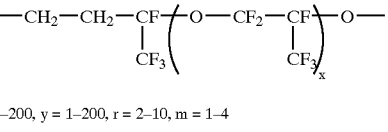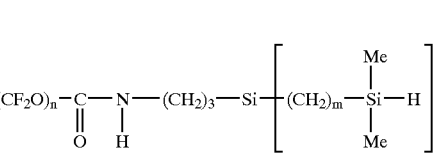

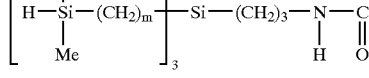

x = 1–200, y = 1–200, r = 2–10, m = 1–4

Component B is generally included in an amount which supplies preferably 0.5 to 5 moles, and most preferably 1 to 2 moles, of hydrosilyl groups (SiH) per mole of alkenyl groups (e.g., vinyl, allyl, cycloalkenyl) on component A. Too little component B may make the degree of crosslinking inadequate, whereas too much may favor chain extension at the expense of curing, may result in foaming of the composition, or may be detrimental to the heat resistance, compressive set and other properties of the rubber parts ultimately obtained.

The hydrosilylation catalyst serving as component C is preferably a transition metal, such as a platinum group metal (e.g., platinum, rhodium, palladium), or a transition metal compound. Such compounds are generally precious metal compounds, and thus very expensive. Accordingly, the use of platinum compounds which are relatively easy to acquire is advantageous for the purposes of the invention.

Illustrative, non-limiting, examples of suitable platinum compounds include hexachloroplatinic acid, complexes of hexachloroplatinic acid with an olefin such as ethylene, complexes of hexachloroplatinic acid with an alcohol and vinyl siloxane, and platinum on silica, alumina or carbon.

Platinum group metal compounds other than platinum compounds that may be used include rhodium, ruthenium, iridium and palladium compounds. Specific examples include $RhCl(PPh_3)_3$, $RhCl(CO)(PPh_3)_2$, $RhCl(C_2H_4)_2$, $Ru_3(CO)_{12}$, $IrCl(CO)(PPh_3)_2$ and $Pd(PPh_3)_4$, wherein "Ph" stands for phenyl.

The amount of catalyst used is not subject to any particular limitation, an ordinary amount of catalyst being sufficient to achieve the desired curing rate. However, use of the catalyst in an amount of from 0.1 to 1,000 ppm (platinum group metal basis), and especially from 0.1 to 500 ppm, relative to the overall curable composition, is advantageous for economic reasons and for achieving a good cured product.

Component D is a silica filler having an average particle size of preferably 0.001 to 10 µm, and most preferably 0.005 to 5 µm. Specific examples include fumed silica and quartz powder.

The silica filler is typically used in an amount of 1 to 200 parts by weight, and preferably 10 to 100 parts by weight, per 100 parts by weight of the perfluoropolyether polymer serving as component A. Too little silica filler results in rubber parts which have a low hardness and a low strength, whereas too much silica filler gives rubber parts which have a low strength and a low elongation.

If necessary, various additives may be added to the curable composition of the invention to enhance its usefulness. Examples of such additives include $CH_2=CH(R)SiO$ (wherein R is a hydrogen atom or a substituted or unsubstituted monovalent hydrocarbon group) unit-containing polysiloxanes (see JP-B 48-10947) and acetylene compounds (see U.S. Pat. No. 3,445,420 and JP-B 4-3774) added to control the curing rate of the curable composition, and ionic compounds of heavy metals (see U.S. Pat. No. 3,532,649).

The curable composition used in the invention may also have added thereto a filler other than silica to reduce heat shrinkage during curing and lower the thermal expansion coefficient of the elastomer obtained by curing the composition, to enhance certain properties of the inventive rubber parts, including their thermal stability, weatherability, chemical resistance, fire retardance and mechanical strength, and to decrease the gas permeability of the rubber parts. Examples of such additional fillers include glass fibers, carbon, metal oxides such as iron oxide, titanium oxide and cerium oxide, and metal carbonates such as calcium carbonate and magnesium carbonate. If necessary, suitable pigments and dyes may also be added.

The curable composition used in the invention may be a millable type material, or it may be a liquid injection molding system (LIMS) type material prepared by mixing two liquid components and curing under applied heat.

If a millable type material is used, the requisite components are blended on a two-roll mill, then molded by a suitable molding process such as compression molding, transfer molding or injection molding. The molding temperature is preferably 80 to 180° C., and most preferably 100 to 160° C. The molding pressure is preferably 10 to 300 $kgf/cm^2$, and most preferably 20 to 150 $kgf/cm^2$.

If a LIMS type material is used, the liquid components are mixed in suitable amounts, following which the mixture is molded by a suitable molding process such as compression molding, transfer molding or injection molding. Injection molding while mixing the liquid components primarily with a LIMS machine is preferred. The molding temperature and pressure are preferably within the same ranges as those indicated above for millable type materials. When molding is carried out at above the indicated temperature range, the curing reaction proceeds before the composition has fully assumed the desired product shape. The resulting product may thus have a defective appearance, such as a flow pattern or weld lines. On the other hand, when molding is carried out at a temperature below 80° C., curing takes more than 1 hour, which may be impractical in terms of production efficiency.

Prior to using the curable composition of the invention, the composition may first be dissolved to the desired concentration in a fluorinated solvent suitable for the intended application and purpose, such as 1,3-bistrifluoromethylbenzene or perfluorooctane.

The rubber aircraft parts of the invention are made of the cured form of the above-described curable composition. They have good resistance to jet fuels, jet engine oils, and amines and oils, good resistance to gas permeability, good heat and water resistance, and excellent cold resistance. These qualities enable them to be used as sealing materials, such as O-rings, face seals, packings and gaskets, and also as other types of rubber parts, including diaphragms and valves.

EXAMPLES

Examples of the invention and comparative examples are given below to illustrate the invention, and are not intended to limit the scope thereof.

In each of Examples 1 to 3 and Comparative Examples 1 to 3 below, test specimens were fabricated and their properties shown in Table 1 were measured. The results are shown in Table 1.

The measurement methods are as follows.

Original Properties

Hardness was measured according to JIS K 6253.

Tensile strength and elongation was measured according to JIS K 6251.

Heat Resistance

The test specimen was kept in a drier at the temperature shown in Table 1 for 70 hours, and then cooled to room temperature. Thereafter, the hardness, tensile strength and elongation were measured in the same manner as above. The heat resistance is shown as the change from the original property.

Compression Set

Compression set was measured according to JIS K 6262.

Jet Engine Oil Resistance

The test specimen was immersed in Mobil 254 (available from Mobil Co., Ltd.) at 200° C. for 70 hours. Then the test specimen was taken out from Mobil 254 and fully wiped to remove Mobil 254 from the surface of the test specimen. Thereafter, the hardness, tensile strength, elongation and compression set were measured in the same manner as above to evaluate the change from the original property.

Fuel Resistance

The test specimen was immersed in Fuel B at 40° C. for 70 hours. Then the test specimen was taken out from Fuel B and fully dried. Thereafter, the hardness, tensile strength, elongation and compression set were measured in the same manner as above to evaluate the change from the original property.

Solvent Swelling

Solvent swelling was measured according to JIS K 6258 by the test specimen was immersed in the solvent shown in Table 1 at room temperature for 168 hours.

Low-Temperature Torsional Test, TR Test, Low-Temperature Brittleness by Impact Test They were measured according to JIS K 6261.

| | |
|---|---|
| JIS K 6251 | Tensile testing methods for vulcanized rubber |
| JIS L 6253 | Hardness tesing methods for rubber, vulcanized or thermoplastic |
| JIS K 6258-1993 | Testing methods of the effect liquids for vulcanized rubber |
| JIS K 6261 | Low temperature testing methods for rubber, vulcanized or thermoplastic |
| JIS K 6262 | Permanent set testing methods for rubber, vulcanized or thermoplastic |

Example 1

Component A (62 g) and Component B (60 g) of the liquid fluororubber SIFEL 3701 (manufactured by Shin-Etsu Chemical Co., Ltd.) having a perfluoropolyether structure were mixed and vacuum degassed. The degassed material was poured into a mold measuring 170×130×2 mm and compression molded using a molding machine with a 50-ton press at 150° C. and 80 kgf/cm$^2$ for 10 minutes to form a 170×130×2 mm sheet-like test piece. The test piece was post-cured at 200° C. for a period of 4 hours, yielding a finished test specimen.

Example 2

A test specimen was fabricated in the same way as in Example 1, but using the liquid fluororubber SIFEL 4750 (manufactured by Shin-Etsu Chemical Co., Ltd.) having a perfluoropolyether structure.

Example 3

A test specimen was fabricated in the same way as in Example 1, but using the liquid fluororubber SIFEL 4755 (Shin-Etsu Chemical Co., Ltd.) having a perfluoropolyether structure.

The liquid fluororubbers SIFEL 3701, 4750 and 4755 contain the above-said components A to D.

Comparative Example 2

A test specimen was fabricated in the same way as in Comparative Example 1, but using the cold-resistant fluororubber Viton GLT (a vinylidene fluoride-ethylene tetrafluoride-perfluorovinyl methyl ether copolymer manufactured by E.I. DuPont de Nemours and Co.).

Comparative Example 3

The fluorosilicone rubber FE271 (manufactured by Shin-Etsu Chemical Co., Ltd) was compression molded using a molding machine with a 50-ton press at 170° C. and 100 kgf/cm$^2$ for a period of 15 minutes to form a sheet-like test piece measuring 170×130×2 mm. The test piece was then post-cured at 200° C. for 24 hours, yielding a finished test specimen.

TABLE 1

|  |  |  | Example | | | Comparative Example | | |
|---|---|---|---|---|---|---|---|---|
| Tests |  |  | 1 | 2 | 3 | 1 | 2 | 3 |
| Original properties |  | Hardness (type A durometer) | 70 | 72 | 73 | 71 | 71 | 70 |
|  |  | Tensile strength (Mpa) | 7.3 | 6.8 | 7.8 | 12.5 | 15.2 | 8.9 |
|  |  | Elongation (%) | 170 | 130 | 140 | 240 | 240 | 260 |
| Heat | 150° C. | Change in hardness (%) | +1 | +1 | +1 | +2 | +1 | +2 |
| resistance |  | Change in tensile strength (%) | −5 | −4 | −3 | −1 | −2 | −10 |
| (70 hours) |  | Change in elongation (%) | −7 | −6 | −7 | −5 | −3 | −4 |
|  | 200° C. | Change in hardness (%) | +1 | +2 | +2 | +1 | +2 | +2 |
|  |  | Change in tensile strength (%) | −5 | −8 | −9 | +12 | +4 | −5 |
|  |  | Change in elongation (%) | −4 | −10 | −10 | −11 | −10 | −9 |
| Compression set | 150° C. | Deformation (%) | 9 | 5 | 4 | 9 | 16 | 10 |
| (70 hours) | 200° C. | Deformation (%) | 21 | 14 | 11 | 25 | 36 | 31 |
| Jet engine oil |  | Change in hardness (%) | −4 | −3 | −3 | −10 | −9 | rub- |
| resistance |  | Change in tensile strength (%) | −11 | −9 | −7 | −71 | −20 | ber |
| (Mobil 254; |  | Change in elongation (%) | +12 | +5 | +7 | −63 | −32 | dis- |
| 200° C. × 70 hrs) |  | Compression set (%) | 31 | 12 | 8 | 58 | 28 | solved |
| Fuel resistance |  | Change in hardness (%) | −4 | −3 | −5 | −18 | −17 | −18 |
| (Fuel B; |  | Change in tensile strength (%) | −15 | −12 | −13 | −34 | −42 | −31 |
| 40° C. × 70 hrs) |  | Change in elongation (%) | −13 | −12 | −11 | −30 | −20 | −29 |
|  |  | Compression set (%) | 5 | 3 | 2 | 7 | 8 | 6 |
| Solvent | Toluene | Change in volume (%) | +5 | +4 | +6 | +20 | +19 | +32 |
| swelling | Ethanol | Change in volume (%) | +3 | +2 | +3 | +70 | +85 | +8 |
| (room temp. | MEK | Change in volume (%) | +6 | +5 | +6 | +202 | +213 | +175 |
| × 168 hrs) | Tributyl amine | Change in volume (%) | +7 | +6 | +6 |  | rubber dissolved |  |
| Low-temperature |  | T2 (° C.) | −37 | −38 | −36 | −7 | −21 | −50 |
| torsional test |  | T5 (° C.) | −47 | −47 | −46 | −12 | −26 | −60 |
|  |  | T10 (° C.) | −50 | −51 | −51 | −16 | −28 | −63 |
|  |  | T100 (° C.) | −55 | −56 | −56 | −23 | −34 | <−70 |
| TR test |  | TR10 (° C.) | −50 | −48 | −49 | −17 | −31 | −66 |
|  |  | TR40 (° C.) | −39 | −38 | −39 | −11 | −23 | −41 |
| Low-temperature brittleness by impact test |  | Brittleness temperature (° C.) | −55 | −54 | −54 | −20 | −35 | <−70 |

Comparative Example 1

The binary fluororubber Viton E-60C (a vinylidene fluoride-hexafluoropropylene copolymer manufactured by E.I. DuPont de Nemours and Co.) was compression molded using a molding machine with a 50-ton press at 170° C. and 100 kgf/cm$^2$ for a period of 15 minutes to form a sheet-like test piece measuring 170×130×2 mm. The test piece was then post-cured at 230° C. for 24 hours, yielding a finished test specimen.

As is apparent from the results in Table 1, the rubber aircraft parts according to the invention exhibited good resistance to jet fuels, jet engine oils and amines, good cold resistance, good compression set properties, and good heat resistance.

The rubber aircraft parts of the invention provide dramatically improved sealability at temperatures below the minimum service temperatures normally achievable in prior-art low-temperature fluororubbers, i.e., at −25 to −55° C., particularly during use in a dynamic state. The inventive rubber parts also provide markedly improved resistance to amines and other chemicals. These qualities enable the rubber parts of the invention to ensure the reliable sealability of fluid line junctions in jet engines.

Japanese Patent Application No. 2001-259925 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A rubber part for use in an aircraft, which part is made of the cured form of a curable composition comprising:
   (A) a linear fluoropolyether compound having at least two alkenyl groups per molecule and a backbone with a perfluoropolyether structure of —$C_dF_{2d}O$— repeating units, the letter d in each unit being independently an integer from 1 to 6;
   (B) an organosilicon compound having at least two silicon-bonded hydrogen atoms (SiH groups) per molecule in which every silicon-bonded hydrogen atom belongs to a

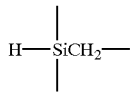

structure;
   (C) a hydrosilylation catalyst; and
   (D) a silica filler having an average particle size of 0.001 to 10 μm.

2. The rubber part of claim 1, wherein the linear fluoropolyether compound of component (A) is one represented by the general formula (3) or (4):

$$CH_2=CH—(X)_p—Rf—(X)_p—CH=CH_2 \qquad (3)$$

$$CH_2=CH—(X)_p—Q—Rf—Q—(X)_p—CH=CH_2 \qquad (4)$$

in which X is independently —$CH_2$—, —$CH_2O$— or —Y—NR'—CO— wherein Y is —$CH_2$— or a group of the structural formula (2)

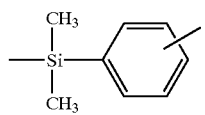
(2)

(wherein the free valence bond may be at the o-, m- or p-position); and R' is a hydrogen atom or a methyl, phenyl or allyl group, Rf is a divalent perfluoropolyether structure of the formula ($C_dF_{2d}O)_q$, wherein the letter d is independently an integer from 1 to 6 and the letter q is an integer from 1 to 500, the letter p is independently 0 or 1, and Q is a divalent hydrocarbon group of 1 to 15 carbons which may include an ether linkage.

3. The rubber part of claim 1 wherein the organosilicon compound of component (B) has the following general formula (5)

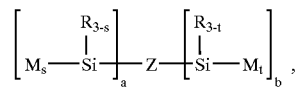
(5)

wherein M is a moiety of the following general formula

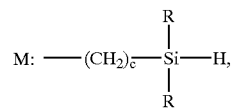

the letter c is 1, 2, 3 or 4; each R is independently a monovalent $C_{1-20}$ hydrocarbon; Z is —Q'—M, —Q'—Rf', —Q'—, —Rf"— or —Q'—Rf—Q'— (Q' being a divalent $C_{1-15}$ linkage, Rf' being a monovalent perfluoroalkyl or perfluorooxyalkyl group, and Rf" being a divalent perfluoroalkylene or perfluorooxyalkylene group); the letter s is 1, 2 or 3; the letter t is 1, 2 or 3; and the letters a and b are 0 or 1, provided a and b are not both 0.

4. A method for sealing the space between a first aircraft part and a second aircraft part wherein both aircraft parts are located on an aircraft in the vicinity of a jet engine; said method comprising:
   (I) filling the space with a curable composition comprising:
      (A) a linear fluoropolyether compound having at least two alkenyl groups per molecule and a backbone with a perfluoropolyether has a structure of —$C_dF_{2d}O$— repeating units, the letter d in each unit being independently an integer from 1 to 6;
      (B) an organosilicon compound having at least two silicon-bonded hydrogen atoms (SiH groups) per molecule in which every silicon-bonded hydrogen atom belongs to a

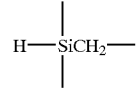

structure;
      (C) a hydrosilylation catalyst; and
      (D) a silica filler having an average particle size of 0.001 to 10 μm and then
   (II) curing the curable composition.

5. The method of claim 4, wherein the linear fluoropolyether compound of component (A) is one represented by the general formula (3) or (4):

$$CH_2=CH—(X)_p—Rf—(X)_p—CH=CH_2 \qquad (3)$$

$$CH_2=CH—(X)_p—Q—Rf—Q—(X)_p—CH=CH_2 \qquad (4)$$

in which X is independently —$CH_2$—, —$CH_2Q$— or —Y—NR'—CO— wherein Y is

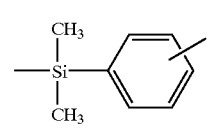
(2)

—$CH_2$— or a group of the structural formula (2) (wherein the free valence bond may be at the o-, m- or p-position); and R' is a hydrogen atom or a methyl, phenyl or allyl group, Rf is a divalent perfluoropolyether structure of the formula $(C_dF_{2d}O)_q$, wherein the letter d is independently an integer from 1 to 6 and the letter q is an integer from 1 to 500, the letter p is independently 0 or 1, and Q is a divalent hydrocarbon group of 1 to 15 carbons which may include an ether linkage, and component (B) is (a) a fluorinated organohydrosiloxane and/or (b) an organosilicon compound in which every silicon-bonded hydrogen atom belongs to a

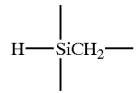

structure.

* * * * *